United States Patent [19]
Sharif et al.

[11] 3,983,380
[45] Sept. 28, 1976

[54] AUXILIARY MEMORY UNIT FOR USE WITH AN ELECTRONIC DISPLAY CALCULATOR

[75] Inventors: Louay E. Sharif, Atherton; John R. Moore, Pasadena, both of Calif.

[73] Assignee: McDonnell Douglas Corporation, Long Beach, Calif.

[22] Filed: Aug. 11, 1975

[21] Appl. No.: 603,401

[52] U.S. Cl. .............................................. 235/156
[51] Int. Cl.² ...................... G06F 3/14; G06F 3/02; G06F 7/38
[58] Field of Search.................. 235/156; 340/172.5

[56] References Cited
UNITED STATES PATENTS
3,855,461  12/1974  Stockwell........................... 235/156

OTHER PUBLICATIONS
Hewlett–Packard, *The HP–65 Fully Programmable Pocket Calculator*, Hewlett–Packard pub. 5952-6031D, Feb. 1974, p. 9 and back cover.

*Primary Examiner*—R. Stephen Dildine, Jr.
*Attorney, Agent, or Firm*—Townsend and Townsend

[57] ABSTRACT

An auxiliary memory unit for use with electronic calculators which enables verification of a series of numeric data and function entries without requiring manual re-entry. Data and function signals generated by manual actuation of a calculator keyboard are sequentially stored in a storage device in the auxiliary memory unit during a first mode of operation, termed STORE.

After a complete series of entries has been made, the stored signals are sequentially read out and displayed in the original order of entry during a second mode of operation, termed READ. The stored function signals are also read out so that the read out numeric data signals are processed by the calculator during READ. The unit further includes edit function circuitry for enabling erroneous data to be corrected by operation of the calculator keyboard, circuitry for providing automatic data alignment at the beginning of the READ operating, and circuitry for indication an incipient full condition for the auxiliary memory unit storage device during the STORE operation.

19 Claims, 12 Drawing Figures

Fig_1

Fig_2

Fig_4

Fig_3

AUXILIARY MEMORY UNIT FOR USE WITH AN ELECTRONIC DISPLAY CALCULATOR

BACKGROUND OF THE INVENTION

This invention relates to electronic calculators, and more particularly to electronic display calculators of the nonprinting type.

Electronic display calculators, particularly those of the hand-held or pocket size, have achieved wide popularity in both business and nonbusiness applications particularly due to their low cost and convenient size. Such calculators are typically provided with a manually actuatable keyboard having a set of digit keys and functions keys, a visible multidigit display, typically comprising an LED display, a battery power source, and electronic circuitry usually embodied on a single integrated circuit chip for performing manually specified arithmetic and transfer functions on numeric data entered manually via the keyboard. Typically, the manually entered numeric data and the calculation results are displayed, while symbols representing the specified functions are not.

A serious disadvantage inherent in display calculators which is not shared by electronic printing calculators is the lack of capability for providing a quick check on the correctness of entry of the numeric data and also the correctness of entry of the specified functions. In an electronic printing calculator, for example, a printed tape is produced for all entries, which contains a permanent record of the entered data, the function specified by the operator and the calculation results. Thus, to check the correctness of a particular computation or series of computations, it is only necessary for the operator to view the printed tape. In a display calculator, on the other hand, no such permanent record is produced. Accordingly, the only way to check the correctness of a series of computations is to re-enter the numeric data and operate the function keys a second time in the proper sequence to check the result against the first computation. This is a time consuming process which effectively doubles the length of time required to perform a set of calculations and to verify the accuracy of the result. In addition, entry errors can be made by the operator when performing the second set of computations which then necessitates a third set of computations to arrive at a verified result.

SUMMARY OF THE INVENTION

The invention comprises a novel auxiliary unit for use with electronic display calculators which enables quick and virtually automatic verification of a series of computations and data entries to be performed without necessitating manual re-entry of the numeric data or the functions previously entered, and which enables incorrectly entered data to be deleted and correct data to be substituted therefor during the verification procedure.

In its broadest aspect, the invention comprises an auxiliary memory unit for cumulatively storing keyboard generated numeric data and function signals in accordance with their order of generation and for sequentially supplying the stored signals to the calculator entry portion for processing on command after termination of a series of computations. The auxiliary memory unit includes a storage means, e.g. a serial shift register array having an input and an output, input means coupled to the input of a storage means and adapted to be coupled to the calculator data and function signal generating portion, output means coupled to the output of the storage means and the input means for supplying signals to the calculator entry portion, and control means including a plurality of switches and a clock generator and control unit for directing operation of the auxiliary memory unit. The input means includes encoder means for encoding data and function signals from the calculator into a character format compatible with the storage means. The output means includes decoder means for decoding characters fetched from the storage means into a signal format compatible with the calculator entry portion. The output means further includes gating circuitry for coupling signals from the calculator data and function signal generating portion to the calculator entry portion during a first mode of operation terminal STORE, and for coupling signals from the storage means to the calculator entry portion during a second mode of operation termed READ.

In the STORE mode of operation, data and function signals generated in response to actuation of the calculator keys are encoded and cumulatively stored in the auxiliary memory unit storage means and are also coupled by the output gating circuitry to the calculator entry portion where these signals are conventionally processed. In the READ mode of operation, the characters stored in the auxiliary memory unit storage means are sequentially fetched in accordance with their order of entry, decoded and coupled by the output gating circuitry to the calculator entry portion for conventional processing. In the preferred embodiment, the characters are fetched by manually actuating a sequence switch, which conditions the control means to permit readout of a set of characters corresponding to a complete original numeric data entry or a single character corresponding to a function signal.

Since the signals supplied to the calculator entry portion are processed in a conventional manner during the READ mode, correctness of the original data entry can be visually verified by observing the display. To correct an erroneous original data entry, the invention includes manually actuatable editing means for halting the normal READ operation to permit the incorrect data to be cleared from the calculator entry portion and to enable correct data to be entered therein. After the edit correction, the editing means is disabled and the normal READ operation is resumed.

The storage means may be operated in either a normal destructive readout mode or a recirculate mode, and is preferably provided with an expandable input portion to accommodate entry of numeric data during the edit operation which is larger than the deleted incorrect data. In addition, the storage means preferably includes means for indicating an incipient full condition during STORE mode of operation, e.g. a counter which is responsive to entry of a specified number of characters in the storage means less than the total storage capacity to generate a signal used to actuate a warning lamp. The storage means may further include means for disabling keyboard entry after the storage means is fully loaded during STORE mode of operation.

The clock generator and control unit includes means for generating a variable speed clock signal train for controlling operation of the storage means, viz. a slow speed clock for fetching stored characters at a rate compatible with the signal recognition time of the associated calculator during READ mode of operation, a high speed clock for clearing the storage means prior to storing fresh data and function characters during STORE mode of operation, and a medium speed clock for storing characters in the storage means at a rate compatible with the minimum signal generation period of the associated calculator. The clock means is preferably controlled by one or more of the manually actuatable function switches included in the control means.

For a fuller understanding of the nature and advantages of the invention, reference should be had to the ensuing detailed description taken in conjunction with the accompanying drawings.

BRIEF DESCRIPTION OF THE DRAWINGS

FIGS. 5A-8 are logic diagrams illustrating a first embodiment of the invention; and FIGS. 9-11 are schematic diagrams showing alternate embodiments of the invention.

DESCRIPTION OF THE PREFERRED EMBODIMENTS

Figure 1:
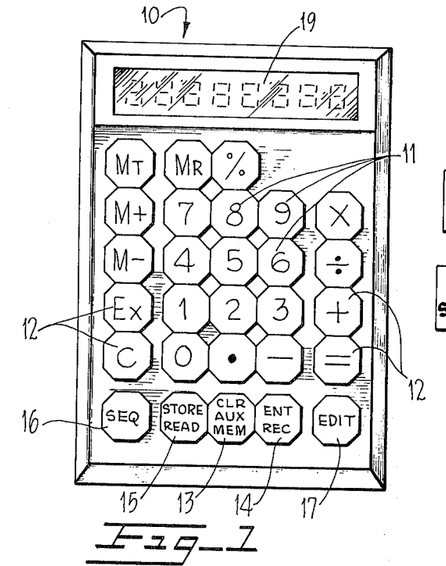
FIG. 1 is a top plan view showing a calculator embodying the invention.

Turning now to the drawings, FIG. 1 illustrates a calculator embodying the invention. As shown in this Fig., an electronic display calculator 10 includes a keyboard having a plurality of digit keys 11 for enabling manual entry of the digits 0-9 and decimal point, a plurality of function keys 12 for enabling conventional arithmetic and data transfer functions to be manually entered, and special purpose function keys 13-17 for enabling manual control of the novel auxiliary memory unit. Calculator 10 further includes a multidigit display 19 which provides a visible indication of entered numeric data and computational results.

Figure 2:
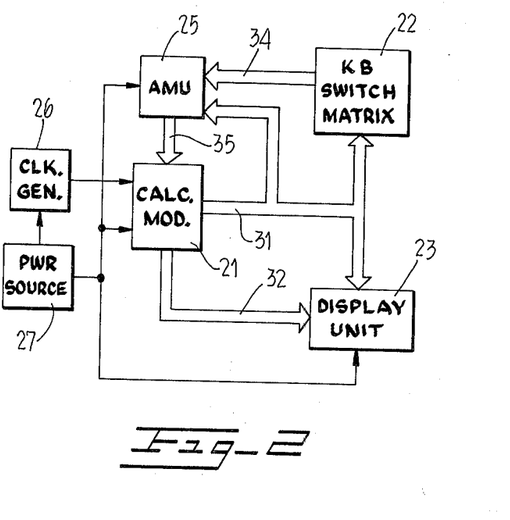
FIG. 2 is a block diagram of a circuit embodied in the calculator of FIG. 1.

With reference to FIG. 2, the circuitry embodied in calculator 10 includes a calculator integrated circuit module, such as that employed in the Commodore Model 886D or 887B electronic display calculator, a conventional matrix-type keyboard 22, a display unit 23 containing conventional seven segment display devices and display drivers, an auxiliary memory unit 25 described more fully below, a clock generator 26 for generating a train of synchronizing pulses for calculator module 21, and a power supply 27 coupled to elements 21, 23, 25 and 26 for powering the circuit.

Figure 3:
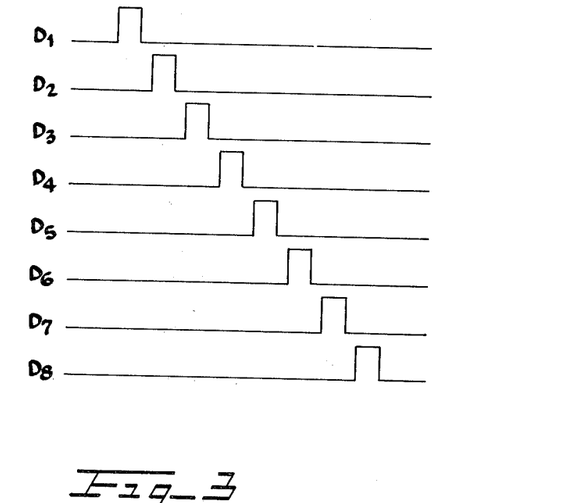
FIG. 3 is a waveform diagram illustrating operating signals used in the circuit of FIG. 2.

Calculator module 21 includes internal circuitry for generating a plurality of system timing signals D1-D8 shown in FIG. 3 which comprise eight sequentially generated, cyclically occurring pulse trains, each pulse having a frequency of about 1.67 KHZ and a pulse width of about 60 microseconds, with successively appearing pulses (e.g. D1 and D2) being separated by a nominal time of about 10 microseconds. The D1-D8 timing signals are coupled via a data bus 31 to the input of keyboard matrix 22 for the well known purpose of sampling the state of the key switches associated with keys 11, 12, and are also coupled to the input of display unit 23 for sequentially activating the plurality of display devices embodied therein. The D1-D8 signals are also coupled to an input of auxiliary memory unit 25 for a purpose described more fully below.

Calculator chip 21 further includes circuitry for generating segment actuation signals which are coupled via a data bus 32 to display unit 23 in order to selectively actuate various segments of the seven segment display elements embodied therein in a conventional manner.

In operation, with power applied to the several elements comprising the circuit of FIG. 2, keyboard matrix 22 is scanned by the D1-D8 timing signals. When a specific key is actuated, a signal is generated on one of four conductors comprising a data bus 34, termed K lines K0-K3. The concurrence of a specific D signal and K signal uniquely identifies the actuated key. The K line and D line signals are both coupled to auxiliary memory unit 25 which functions in a manner described more fully below to store each of the keyboard generated signals in the form of a unique five-bit digital character. The output of auxiliary memory unit 25, comprising the four K line signals, is coupled to the entry portion of calculator module 21 via a data bus 35.

The circuitry of FIG. 2 has two general modes of operation: a STORE mode and a READ mode. In the STORE mode, the K line signals appearing on individual conductors in data bus 34 in response to the actuation of a key 11 or 12 are both stored in auxiliary memory unit 25 for later recall and are also coupled to the calculator entry portion via data bus 35. In the READ mode, the signals stored in auxiliary memory unit 25 are recalled and coupled to the entry portion of the calculator module 21 via data bus 35, while K line signals on data bus 34 are blocked by auxiliary memory unit 25 from transmission to the entry portion of the calculator module 21.

Figure 4:
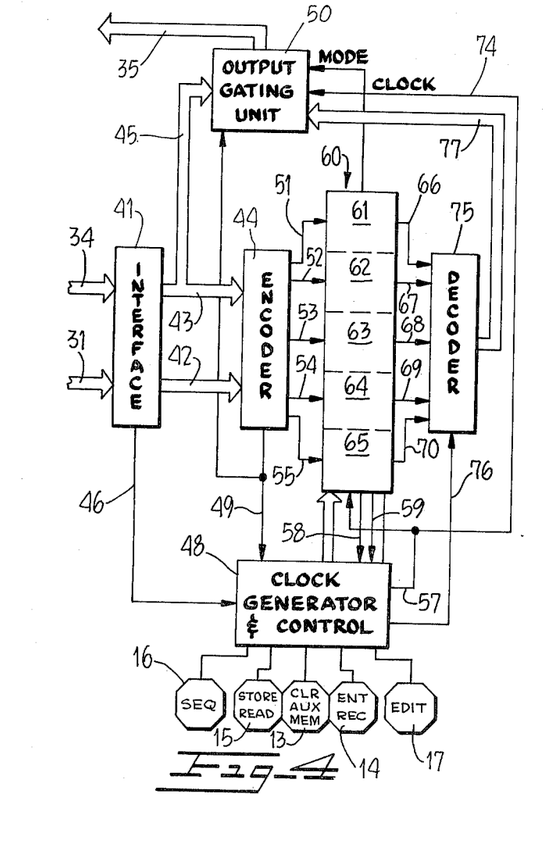
FIG. 4 is a block diagram illustrating the invention.

FIG. 4 is a block diagram of a first embodiment of auxiliary memory unit 25. As seen in this FIG., the D1-D8 timing signals on data bus 31 and the K0-K3 signals on data bus 34 are coupled to an interface unit 41 shown in detail in 5A. Interface unit 41 includes key filter circuits for debouncing the D line and K line signals. The D line and K line output signals from interface unit 41 are coupled via a pair of data buses 42, 43 to the input of an encoder 44 shown in detail in FIGS. 5A and B. In addition, the signals appearing on K line data bus 43 are coupled via a data bus 45 to a first data input of output gating unit 50 shown in detail in FIG. 8. The signals appearing at the output of output gating unit 50 are coupled via data bus 35 to the entry portion of calculator module 21.

Figure 6:
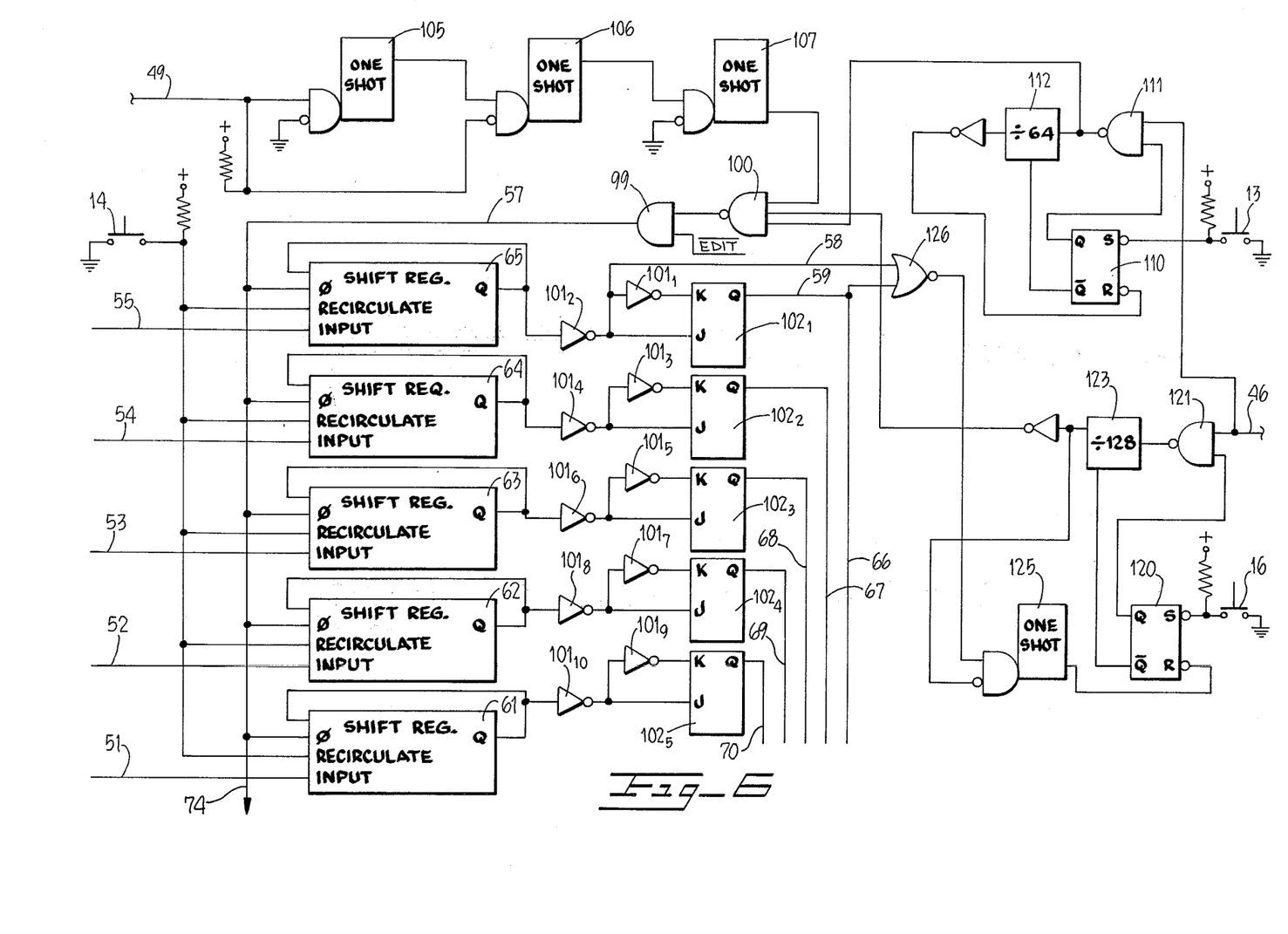

The D1 one digit line signal is coupled from interface unit 41 via lead 46 to an input of a clock generator and control circuit 48 illustrated in detail in FIG. 6 as a reference signal for a purpose to be described.

The remaining inputs to clock generator and control circuit 48 comprise an ANY BIT signal from encoder 44 via conductor 49, which signal is present whenever any valid numeric data or function signal has been received and encoded by encoder 44; switches 13-17 designated as CLEAR AUXILIARY MEMORY switch 13, ENTER/RECIRCULATE switch 14, STORE/READ switch 15, SEQUENCE switch 16, EDIT switch 17; and a pair of control signals on leads 58, 59 from a shift register array 60 shown in detail in FIG. 6.

Encoder 44 functions to encode concurrently received pairs of K line and D line signals into a five-bit binary code in accordance with the following table:

| K | D | Binary | Key | K | D | Binary | Key |
|---|---|--------|-----|---|---|--------|-----|
| $K_0$ | $D_1$ | 00001 | φ | $K_2$ | $D_1$ | 10101 | = |
|  | $D_2$ | 00010 | 1 |  | $D_2$ | — | — |
|  | $D_3$ | 00011 | 2 |  | $D_3$ | 10110 | M ± |
|  | $D_4$ | 00100 | 3 |  | $D_4$ | 10111 | M ≡ |
|  | $D_5$ | 00101 | 4 |  | $D_5$ | 11000 | + |
|  | $D_6$ | 00110 | 5 |  | $D_6$ | 11001 | — |
|  | $D_7$ | 00111 | 6 |  | $D_7$ | 11010 | × |
|  | $D_8$ | 01000 | 7 |  | $D_8$ | 11011 | ÷ |
| $K_1$ | $D_1$ | 01001 | 8 | $K_3$ | $D_1$ | 11100 | EX |
|  | $D_2$ | 01010 | 9 |  | $D_2$ | 11101 | +/− |
|  | $D_3$ | 01011 | (.) |  | $D_3$ | 11110 | M+ |
|  | $D_4$ | 10000 | % |  | $D_4$ | 11111 | M− |
|  | $D_5$ | 10001 | MR |  |  |  |  |
|  | $D_6$ | 10010 | MT |  |  |  |  |
|  | $D_7$ | 10011 | MC |  |  |  |  |
|  | $D_8$ | 10100 | CE/C |  |  |  |  |

To illustrate, if the K0 line and the D6 line are both true, encoder 44 generates a five-bit binary character 00110 to output conductors 40–44, which corresponds to the digit "five" key. Similarly, if the K2 and D5 lines are both true, encoder 44 generates the five-bit character 11000, corresponding to the ADD function key 17. It is noted that any function key is designated by a one bit in the most significant digit position of the 5-bit character output from encoder 44.

The five-bit output characters from encoder 44 are coupled via conductors 51–55 to the parallel data inputs of shift register array 60, in the FIG. 4 embodiment. The clock input to shift registers 61–65 which comprises five 64 bit serial shift registers 61–65 comprises a clock output signal present on lead 57 from clock generator and control circuit 48. The individual data outputs from shift registers 61–65 are coupled via leads 66–70 to the parallel data inputs of a decoder unit 75 shown in detail in FIGS. 7A and B. A control signal designated READ ENABLE, which is generated whenever STORE/READ switch 15 is actuated to specify the READ mode, is also coupled to an enabling input of decoder 75 via lead 76.

Decoder unit 75 converts each five-bit binary character output from memory unit 50 into a one out of four K line signal which is coupled via data bus 77 to a second data input of output gating unit 50.

The remaining inputs to gating unit 50 are a MODE control signal and clock signal, both supplied by clock generator and control circuit 48. As noted above, the output from output gating unit 50 is coupled to the entry portion of calculator 10 via data bus 35.

Figure 5A:
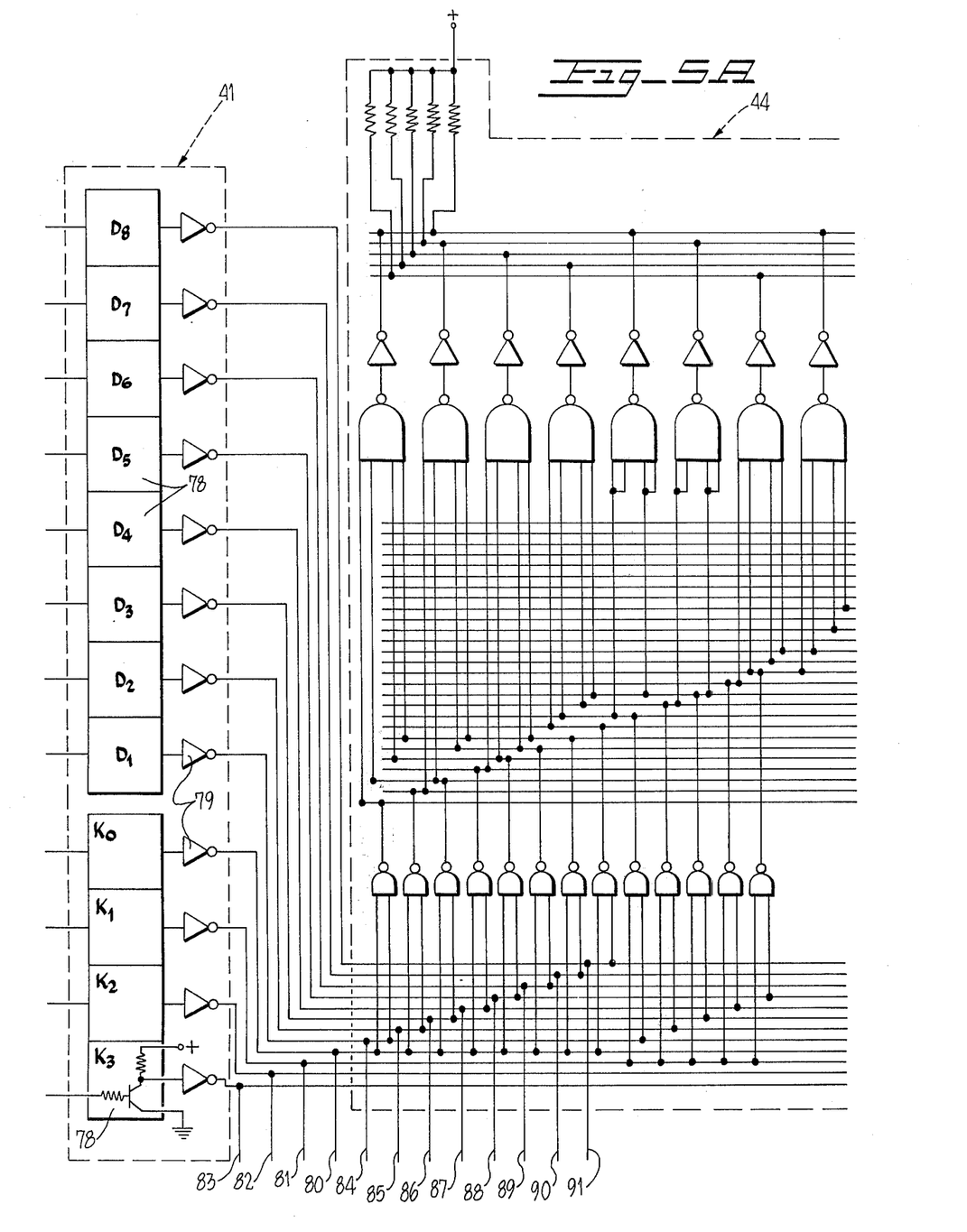
Figure 5B:
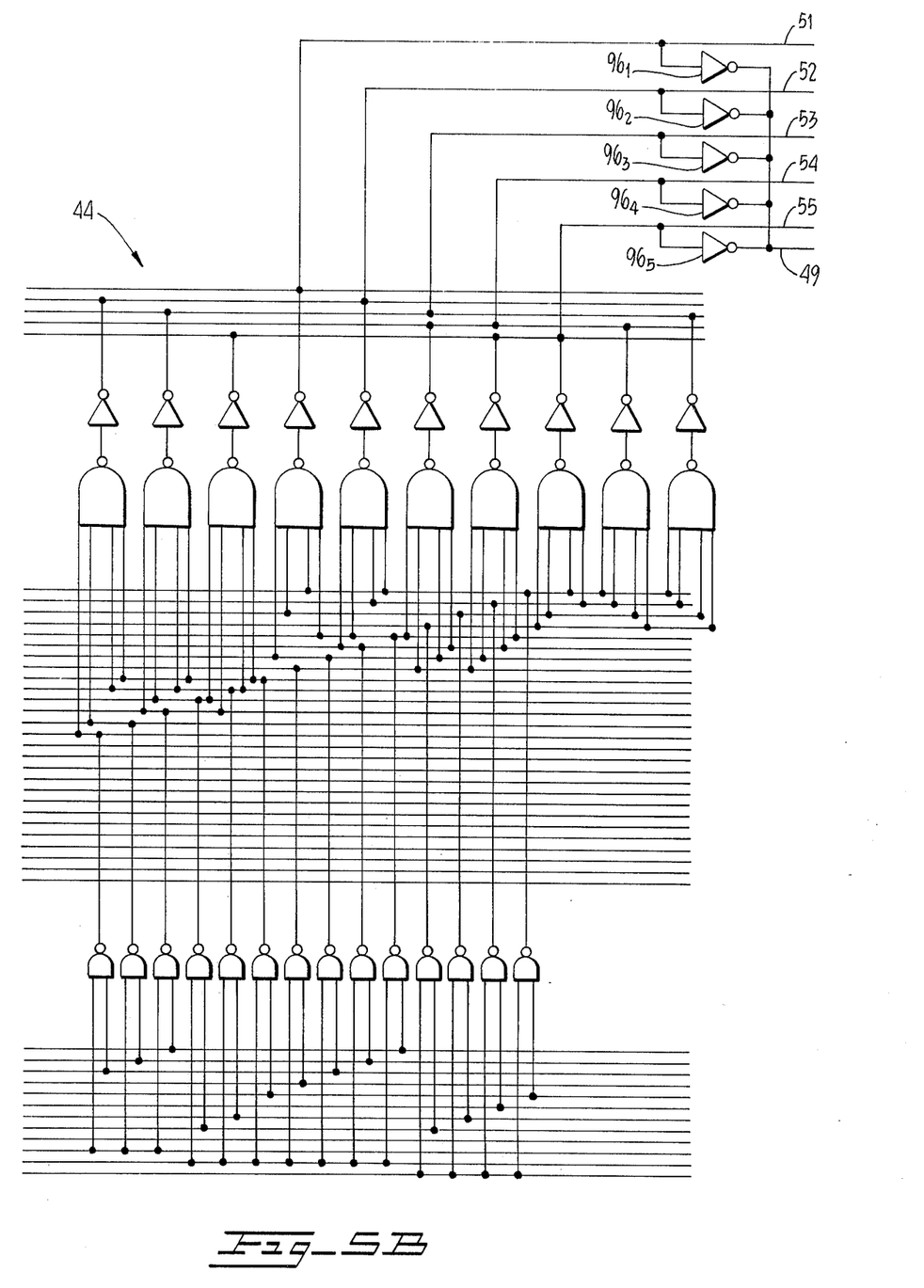

With reference to FIGS. 5A, B the individual D lines and K lines are each coupled initially to a different one of a plurality of conventional key filters 78 each having the configuration shown for the K 3 line, and each having an output coupled to the input of a conventional inverter 79. The outpt of each of the inverters 79 is coupled to selected ones of a plurality of conventional inverting AND gates and also to a plurality of terminals 80–91. The signals appearing on terminals 80–83 comprise the K0–K3 signals, while those signals appearing on terminals 84–91 correspond to the D1–D8 signals. With reference to FIG. 8, the K0–K3 signals on terminals 80–83 are coupled via data bus 45 to a first plurality of inverting AND gates $92_i$ which are enabled whenever an ANY BIT signal is present on conductor 49 and portion 15a of STORE/READ switch 15 is normally open (STORE mode) so that the K0–K3 signals are transmitted through output gating unit 50 and coupled back to calculator 10 for processing. The signals present on terminals 84–91 are each coupled to a different one of a plurality of inverting AND gates $94_i$ of decoder 75 (FIG. 7) for a purpose to be described.

As noted above, the 5-bit character signals from encoder 44 are coupled to the data inputs of shift registers 61–65. These signals are also inverted by conventional inverters $96_1$–$96_5$ and summed on lead 49 to generate an ANY BIT signal, which signal is coupled to clock generator and control circuit 48.

FIG. 6 illustrates the clock generator and control unit 48 and shift register array 60. As seen in this FIG., the five data input terminals 51–55 from encoder 44 are each coupled to the data input of a different one of shift registers 61–65. Shift registers 61–65 each have a clock input coupled via conductor 57 and a control gate 99 controlled by the state of EDIT switch 17 to the output of a clock signal gate 100, a control input coupled to ENTER/RECIRCULATE switch 14 and a recirculate input coupled to the output of the last flip-flop in the shift register string. The outputs of each of the shift registers 61–65 are also coupled via a plurality of conventional inverters $101_i$ to respective ones of a plurality of flip-flops $102_i$, which together comprise an output buffer register for shift register array 60.

Clock signal gate 100 comprises an inverting AND gate having three inputs each coupled to a different clock generating circuit. The first, or STORE, clock generating circuit includes three conventional one-shot circuits 105–107 and associated gates as illustrated. The input to one-shot circuit 105, which has a time-out period of approximately 800 microseconds, comprises the ANY BIT signal on conductor 49. The Q output of circuit 105 is coupled together with the ANY BIT signal on conductor 49 to the trigger input of a second one-shot circuit 106, having a time-out period of approximately 10 microseconds. The output of one-shot circuit 106 is coupled to the trigger input of one-shot circuit 107 having a time-out period of approximately 800 microseconds. The $\overline{Q}$ output of one-shot circuit 107 comprises the medium speed STORE clock which has a period of approximately one and one-half milliseconds.

The second clock input to clocking gate 100 is supplied by a high speed clock signal generator which is used to quickly clear old data from shift registers 61–65 prior to data entry from keyboard matrix 22. The high speed clock generator includes a flip-flop 110 having a set input coupled to the CLEAR AUXILIARY MEMORY switch 13 and an output coupled to a first input of an inverting AND gate 111, the remaining input to which is the D1 digit line signal supplied from interface unit 41 via conductor 46. In the preferred embodiment, the D1 digit line signal comprises a pulse train having a period of 600 microseconds, with each pulse having a width of about 60 microseconds. The output of gate 111 is coupled directly to clocking gate 100 and also to the input of a divide-by-64 unit 112, the output of which is inverted and coupled to the reset input of flip-flop 110. In use, whenever the CLEAR AUXILIARY MEMORY switch 13 is actuated, flip-flop 110 is set and gate 111 transmits the D1 input pulses to clocking gate 100, which pulses are coupled therethrough and used to clock the individual shift registers 61–65. In addition, the pulses passed by gate 111 increment divide-by-64 unit 112. After the last data bit has been clocked out of shift register 61–65, corresponding to a count of 64, unit 112 generates a reset signal which resets flip-flop 110, thereby blocking gate 111.

The remaining input to clocking gate 100 is supplied from a relatively slow speed READ clock generator, which includes a flip-flop 120 having a set input coupled to SEQUENCE switch 16. The set output of flip-flop 120 is coupled to a first input of an inverting AND gate 121; the remaining input to gate 121 comprises the D1 digit line signal. The output of gate 121 is coupled to the input of a divide-by-128 unit 123 which generates an output signal train having a period of approximately 40 milliseconds and which is coupled via clocking gate 100 to the clock input of shift registers 51–55. The output of divide-by-128 unit 123 is also inverted and coupled to the input of a reset circuit 125 together with the output of an OR gate 126 having a first input coupled via lead 58 to the output of the most significant bit shift register 61 and a second input coupled via lead 59 to the output of the most significant bit output buffer register flip-flop $102_i$. Reset circuit 125 functions to reset flip-flop 120 and terminate the READ clock whenever a five-bit function character appears at the output of shift registers 61–65 or at the output of the output buffer registers $102_i$, it being remembered that each function character can be identified by a one value in the most significant bit position. In use, actuation of sequence switch 16 sets flip-flop 120 which conditions gate 121 to transfer the D1 digit signals to the input of unit 123. Unit 123 generates a READ clock pulse substantially every 40 milliseconds, which shifts the next five-bit character out from shift registers 61–65 into output buffer register flip-flops $102_i$. After all digits of a numeric data entry have been so fetched, signified by the appearance of a function character, flip-flop 120 is reset by the output of reset circuit 125 thereby disabling the READ clock circuit until sequence switch 16 is reactuated. Thereafter, reactuation of sequence switch 16 causes the function character stored in the output of shift regiters 61–65 to be clocked into output buffer register flip-flops $102_i$, after which flip-flop 120 is reset by the output of reset circuit 125 thereby disabling the READ clock circuit until sequence switch 16 is again actuated.

It should be noted that the rate of the STORE clock is selected in accordance with the minimum signal generation period of the associated calculator 10; the rate of the CLEAR AUXILIARY MEMORY clock generator and the number of counts required to reset this circuit are dependent upon the parameters of the specific shift registers 61–65; and the speed of the READ clock is dependent upon the minimum valid signal recognition time of the associated calculator 15. Accordingly, when adapting the invention to other known calculators, it may be desirable to change these rates accordingly.

Figure 7:
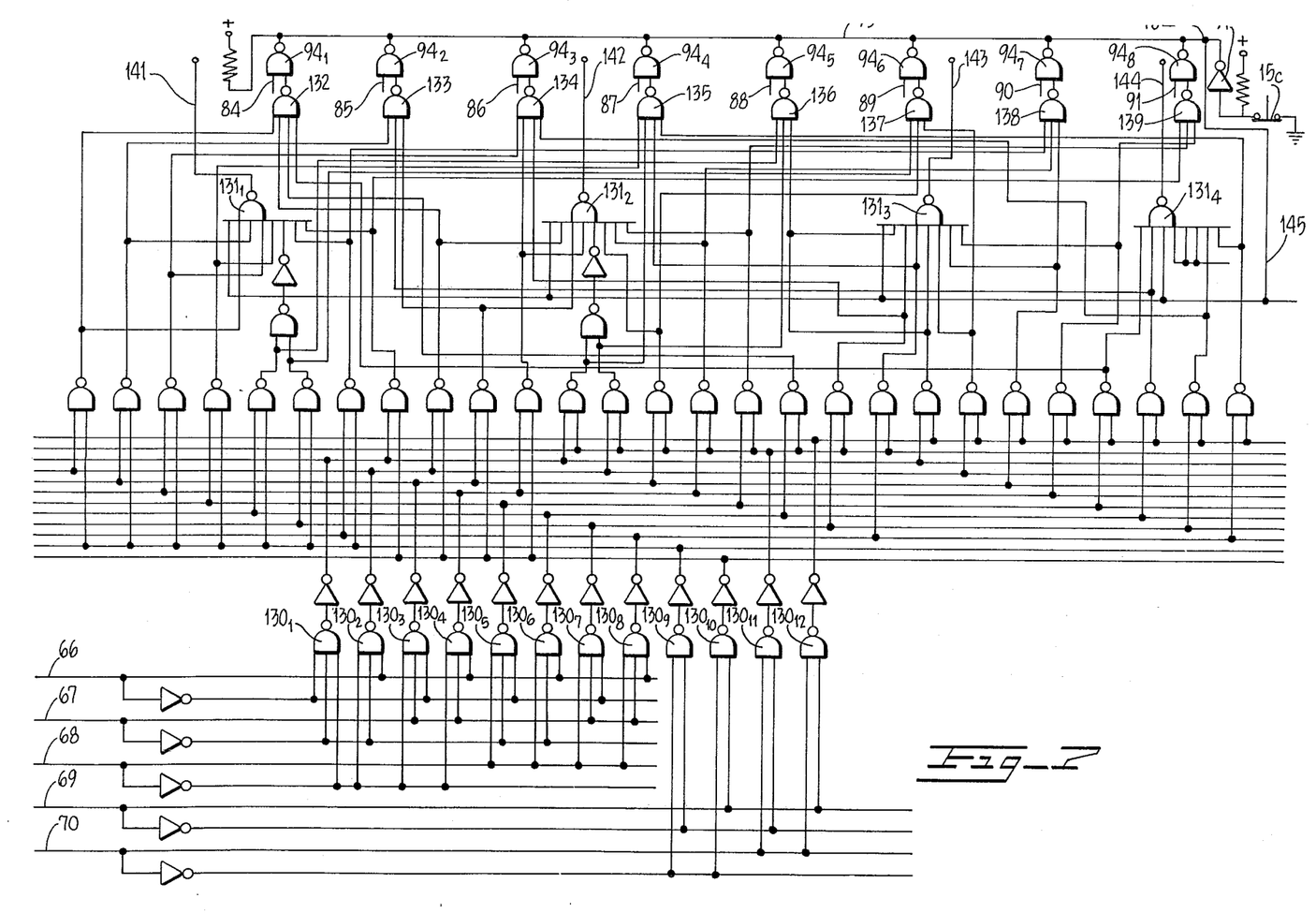
Figure 8:
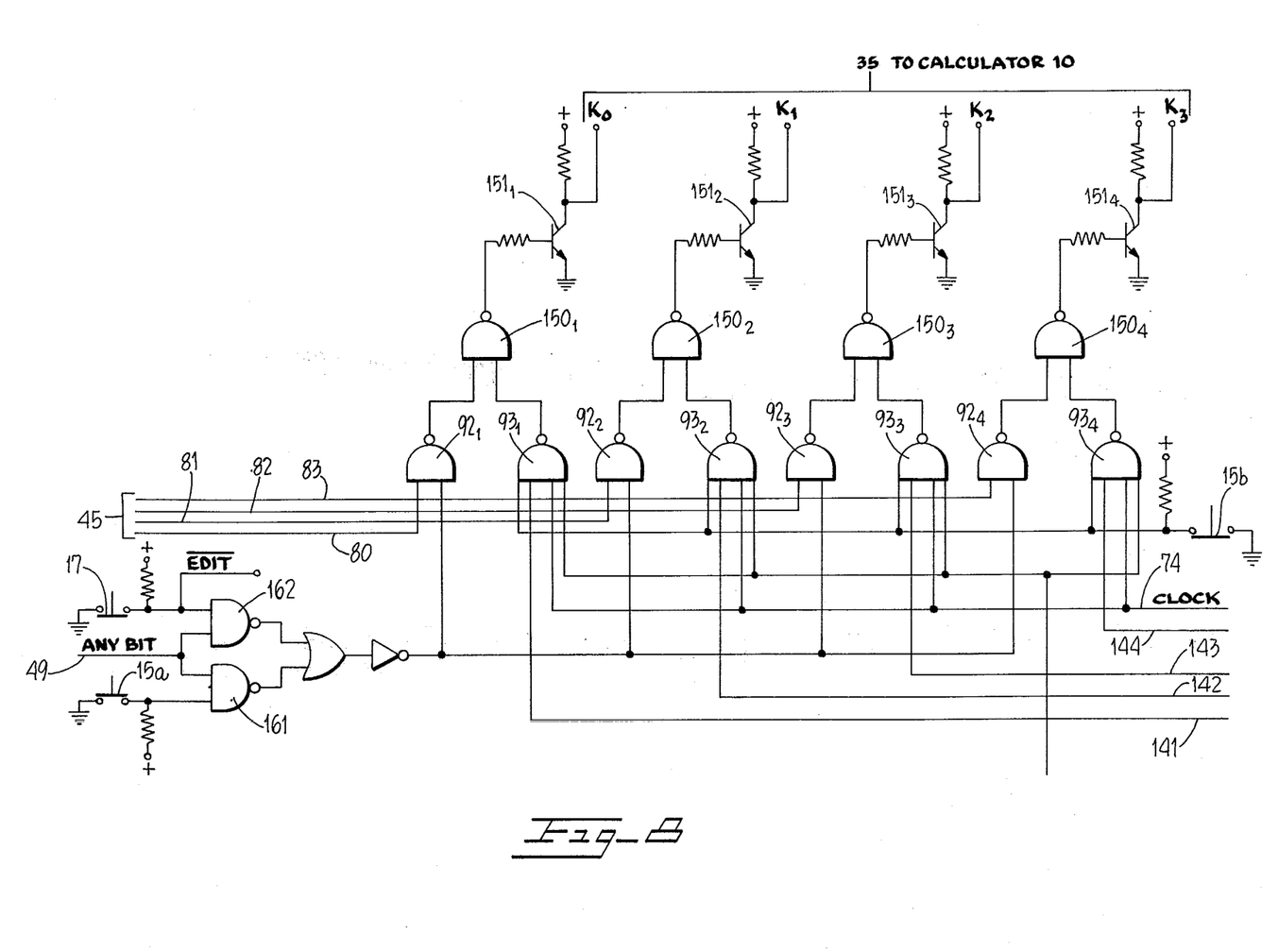

With reference to FIG. 7, output terminals 66–70 from shift register array 60 are coupled to a plurality of input gates $130_i$ of decoder 75. Decoder 75 includes four output gates $131_i$ which are strobed by the concurrence of a proper one of the D1-D8 signals and a signal appearing on one of a plurality of terminals 132–139, the strobe signal being coupled to gates $131_i$ via lead 105 whenever section 15c of STORE/READ switch 15 is actuated to the READ position (switch section 15c open). The output terminals 141–144 of output gates $131_i$, which comprise data bus 77, are coupled to different ones of a plurality of inverting AND gates $93_i$ of output gating unit 50, together with a clock signal on conductor 74 from clock generator and control unit 30.

With reference to FIG. 8, output gating unit 50 includes four gates $150_i$ each having a pair of inputs coupled to the output of a different pair of gates $92_i$, $93_i$ and an output coupled via a separate output circuit $151_i$ to output data bus 35. Gates $92_i$ are enabled whenever section 15a of STORE/READ switch 15 is in the normally open position (signifying STORE mode of operation), or EDIT switch 17 is in the open position, (signifying EDIT operation) and an ANY BIT signal appears on lead 49. When these signal conditions obtain, the states of the K0–K3 lines 80–83 are transferred via gates $92_i$ and $150_i$ to output data bus 35, and thus to the entry portion of calculator 10. Gates $93_i$ are enabled whenever section 15b of STORE/READ switch 15 is open (signifying READ mode) and a clock signal appears on lead 74 from clock generator and control circuit 48. When these signal conditions obtain, the states of the signals on terminals 141–144 comprising data bus 77 from decoder 75 are transferred via gates $93_i$ and $150_i$ to output data bus 35 and thus to the calculator entry portion.

During READ mode of operation, switch section 15a is closed to block the output of a gate 161, thereby disabling gates $92_i$. When EDIT switch 17 is actuated to specify the EDIT operation, however, gate 162 is enabled to transmit an ANY BIT signal to enable operation of gates $92_i$. In addition, with reference to FIG. 6, gate 99 is normally enabled when edit switch 17 is in the unactuated state and control signal $\overline{\text{EDIT}}$ is true. However, when EDIT switch 17 is actuated, the $\overline{\text{EDIT}}$ signal goes false, thereby blocking gate 99 to prevent alteration of the data in shift register array 60. Thus, edit switch 17 overrides the operation of read switch 15.

In operation, with STORE/READ switch 15 in the STORE position, ENTER/RECIRCULATE switch 14 in the ENTER position and EDIT switch 17 in the $\overline{\text{EDIT}}$ position, CLEAR AUXILIARY MEMORY switch 13 is first actuated to generate the high speed clear memory clock pulses which clear old data from shift registers 61–65 of shift register array 60. Thereafter, for each digit key and function key actuated, an ANY BIT signal causes the generation of a single clock pulse by the store clock generator portion of clock generator and control circuit 48, which results in storage of the encoded five-bit character corresponding to the particular actuated key in the input portion of each shift registers 61–65, and the shifting of any previously stored five-bit character to the next successive stage in shift registers 61–65. This process continues until all five-bit characters (up to a maximum of 64 in the embodiment disclosed) have been so entered. During entry of each character, the K0–K3 lines are automatically routed via output gating unit 50 and data bus 35 back to the entry portion of calculator 10 for conventional processing.

After all numeric data and function keys in a given computation sequence have been actuated, and the computational result has been obtained, this result may be verified in the following fashion. STORE/READ switch 15 is actuated to the READ position. Each actuation of sequence switch 16 activates the READ clock generator portion of clock generator and control unit 48, which results in read out of each five-bit character corresponding to the first complete numeric data entry from shift register array 60 via decoder 75, output gating unit 50 and output data bus 35 to the entry portion of the calculator 10. Upon appearance of the first five-bit function character in the output of shift register 61 (signified by a most significant one-bit), the read clock generator is reset by circuit 125 and the now completely fetched first numeric data entry is displayed by display unit 19 of calculator 10 for visual verification. Thereafter, sequence switch 16 is again actuated, the 5-bit function character is read out to the entry portion of calculator 10 which processes the corresponding function signal in the normal manner, and, the read clock generator is reset by circuit 125. Thereafter, sequence switch 16 is again actuated, and the next complete numeric data entry is read out under control of the read clock generator portion of clock generator and control unit 48 and displayed by the calculator display 19. This sequence is continued until each numeric data entry, and computational result, has been displayed for visual verification by the operator.

Once verification is complete, the next computational operation may be initiated by the operator resetting switch 15 to the STORE position, by actuating CLEAR AUXILIARY MEMORY switch 13 and proceeding in the manner described above.

During operation of the invention in the READ mode, if a recalled numeric data entry does not agree with the numeric data which was to have been entered, the incorrect entry may be edited and a correct entry made in the following fashion. EDIT switch 17 is first actuated, which conditions gate 162 to enable gates $92_i$ of output gating unit 50 whenever an any bit signal appears on lead 49, and which disables control gate 99 (FIG. 6) from clocking shift register array 60. Thereafter, the operator actuates the calculator clear key 12 to clear the erroneous data from the entry portion of the calculator 10, and manually endigits the correct data entry. This results in the correct numeric data being coupled via the auxiliary memory unit to the entry portion of calculator 10. Once the correct numeric data entry has been so entered, the edit switch 17 is reset to the normal position, sequence switch 16 is actuated and the READ mode of operation continues. Since the next character read out from shift register array 60 is always a function character, which is coupled via output gating unit 50 to the entry portion of calculator 10, the result of the edit operation is insertion of the correct numeric data entry into calculator 10 followed by processing of this corrected numeric data in the proper manner specified by the subsequently recalled function character.

During verification in the READ mode, it is frequently desirable to read out the stored numeric data from shift register assembly 60 in a non-destructive manner. For example, if the operator is interrupted before the last character has been recalled from shift register array 60, the operator may not remember at which portion of the computational sequence the verification process was interrupted. In order to obtain a meaningful verification, therefore, it will be necessary to return to the start of the data string and begin the read-out mode of operation anew. For this purpose, shift register array 60 is capable of operating in a recirculate mode in which data emerging from the output sections of each of shift registers 61–65 is recirculated back to the input section of these elements. Operation in the recirculate mode is effected by merely actuating ENTER/RECIRCULATE switch 14 to the recirculate position. To facilitate the data realignment, the operator is instructed to always begin the STORE operation with two successive actuations of the calculator clear key 12. This insures that the beginning of a data string can always be identified visually by the operator. Thus, when resuming an interrupted read operation, the operator actuates sequence key 16 repetitively until display unit 19 displays all zeroes for two successive actuations of sequence switch 16.

Since typical display calculators have no provision for the display of a symbol corresponding to the individual functions, it may be desired to add an additional display character, in addition to the customary eight digit display, and appropriate decoder circuitry responsive ot the function characters (which, it will be remembered are uniquely specified by a one value in the most significant bit position) for enabling their display. Implementation of such a function display capability is within the skill of the ordinary routineer and conventional commercially available units may be employed for this purpose, as desired.

Figure 9:
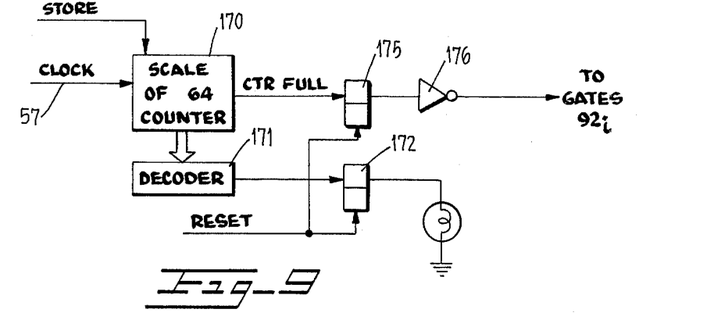

Since shift register array 60 of auxiliary memory unit 25 has a finite storage capability (i.e. 64 five-bit characters in the embodiment disclosed), it may be desirable to provide circuitry for warning the operator that a predetermined storage limit has been reached which will permit further entry of a predetermined number of characters before the shift register array 60 is full. FIG. 9 illustrates one circuit for providing this function. With reference to this FIG., auxiliary memory unit clock pulses supplied by clock generator and control circuit 48 are coupled to the incrementing input of a scale of 64 counter 170. A decoder unit 171 is coupled to predetermined stages of counter 170 to provide an output signal when counter 170 reaches a predetermined limit, e.g., the count of 54 (indicating that only ten more characters can be accepted before shift register array 60 is full). The output of decoder 171 is coupled to the set input of a flip-flop 172, the output of which is used to control illumination of a warning lamp 173 mounted on the housing of calculator 10 in a prominent position. In operation, when STORE/READ switch 15 is actuated to the STORE position, counter 170 is reset by the leading edge of this signal. Thereafter, each clock pulse appearing on lead 57, corresponding to storage of a character in shift register array 60, increments counter 170 by one count. When counter 170 reaches the predetermined count, decoder 171 generates a signal which sets flip-flop 172, thereby illuminating lamp 173. If desired, the set output of flip-flop 172 may be used to actuate a special decoder which drives the most significant display digit in a unique mode, e.g. by displaying the letter F. Such circuitry may be implemented in conventional fashion by those skilled in the art.

The circuit of FIG. 9 additionally terminates entry of additional characters into shift register array 60 and also entry of further numeric data or function signals into the entry portion of calculator 10 once shift register array 60 is filled. This is accomplished by means of a flip-flop 175 coupled to last stage of counter 170 and an inverter 176 having an input coupled to the set output of flip-flop 175 and an output coupled to an additional input terminal provided in gates $92_i$. When counter 170 is counted full, flip-flop 175 is set. The set output of flip-flop 175 is inverted by inverter 176 and used to block gates $92_i$. Flip-flops 172 and 175 may be reset by any appropriate signal, e.g., actuation of the clear auxiliary memory switch 13, or actuation of the STORE/READ switch 15 to the read position. Equivalent circuitry will occur to those skilled in the art.

Figure 10:
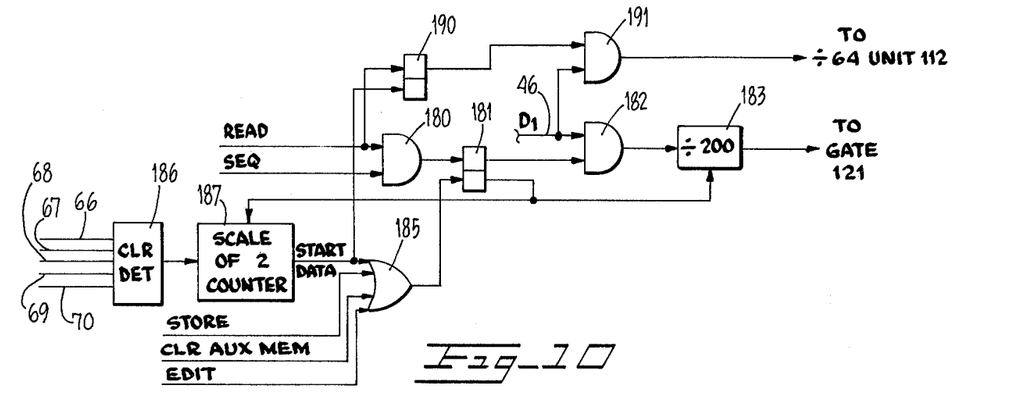

FIG. 10 illustrates a circuit for providing automatic operation in the READ mode which eliminates the necessity of multiple actuation of sequence switch 16. A read signal, which may be obtained from section 15b of STORE/READ switch 15, is coupled to a first input of an AND gate 180, the remaining input to which is sequence switch 16. The output of AND gate 180 is coupled to the set input of a flip-flop 181, the set output of which is coupled to a first input of an AND gate 182. The remaining input to gate 182 is the D1 timing signal from interface unit 41. The output of gate 182 is coupled to the input of a divider circuit 183 which divides the D1 timing signals by an appropriate factor, e.g. a scale of 200. The output of divider circuit 183 is coupled to the upper input terminal of read clock input gate 121 (FIG. 6). The reset input of flip-flop 181 is coupled to the output of an OR gate 185 having appropriate input control signals for terminating automatic readout as specified below. The reset output of flip-flop 181 is coupled to the reset input of divider circuit 183.

The inputs to OR gate 185 are a STORE signal, which may be obtained from section 15a of STORE/READ switch 15, a CLEAR AUXILIARY MEMORY signal obtained from switch 13, an EDIT signal obtained from edit switch 17 and an additional control signal which is generated whenever two clear characters are read out from shift register array 60 in succession. This signal may be generated, for example, by coupling leads 66–70 from the output buffer register stages 102, of shift register array 60 to the input of a detector circuit 186 which is responsive to only the 5-bit clear character, and coupling the output of clear detector circuit 186 to the input of a scale of two counter 187. As will be appreciated by those skilled in the art, whenever two clear characters are read out from shift register array 60 in succession, scale of two counter 187 will be counted full to generate a control signal. Whenever any one of the control signals are present at the input to OR gate 186, flip-flop 181 is reset. The reset output of flip-flop 181 may also be used to reset scale of two counter 187.

In operation, whenever switch 15 is actuated to the READ position, and sequence switch 16 is actuated thereafter, flip-flop 181 is set which enables gate 182 to transmit D1 timing signals to the input of divider circuit 183. Thereafter, whenever divider circuit 183 is counted full, a pulse is generated at the output thereof which is coupled to the read clock input gate 121, thereby enabling the read clock circuit to generate another clocking pulse for shift register array 60. Operation continues in this manner until the occurrence of any one of the four control signals, viz actuation of switch 15 to the store position, actuation of the CLEAR AUXILIARY MEMORY switch 13, actuation of the edit switch 17, or the occurrence of read out of a pair of clear characters in succession. Upon occurrence of any one of these conditions, OR gate 185 generates a reset signal which resets flip-flop 181, thereby blocking gate 182. In addition, reset of flip-flop 181 causes divider circuit 183 and scale of two counter 187 to also be reset.

FIG. 10 further includes circuitry for automatically aligning the characters stored in shift register array 60 at the beginning of READ mode of operation. Actuation of switch 15 to the read positioning sets a flip-flop 190 which enables an AND gate 191 to transmit D1 timing signals to the input of divide-by-64 unit 112 of the fast clock circuit (FIG. 6). Thereafter, shift register array 60 is clocked at the relatively rapid rate until successive clear characters result in the generation of a START DATA control signal, which is used to reset flip-flop 190. When flip-flop 190 is reset, gate 191 is blocked, thereby terminating further operation of the fast clock circuit.

Figure 11:
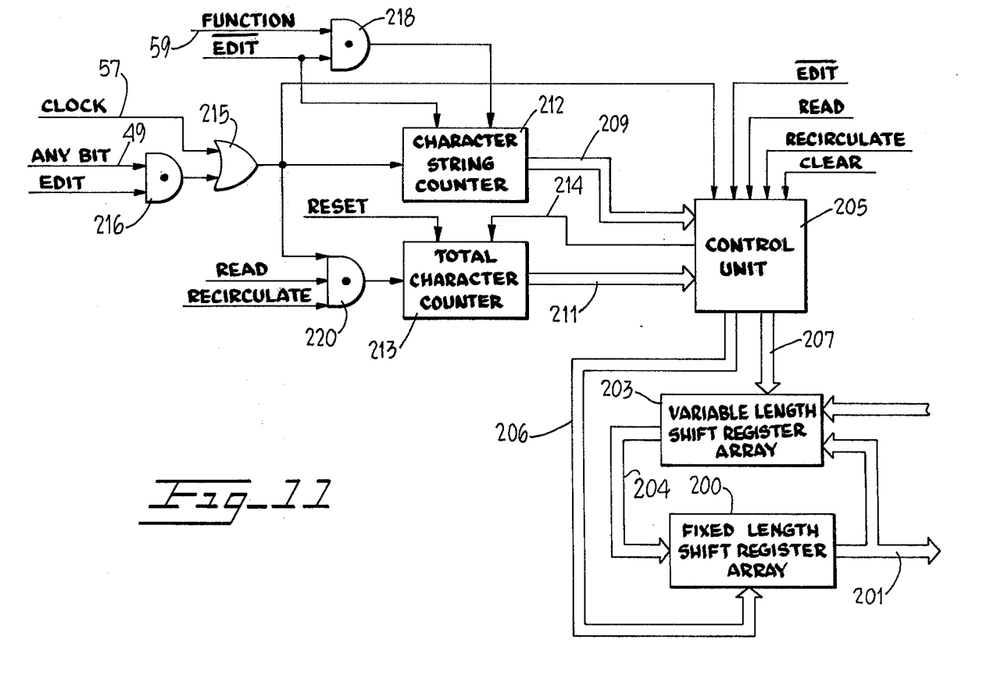

FIG. 11 is a block diagram of a modified storage device providing an expanded EDIT function capability for auxiliary memory unit 25. It may occur during READ operation and RECIRCULATE mode that an incorrect original data entry must be corrected by executing the EDIT function and entering numeric data having a different number of digits than the original incorrectly entered data. to accomplish the EDIT function without destroying the integrity of the data string, the variable shift register array shown in FIG. 11 may be employed. As seen in this FIG., a serial shift register array 200 similar to serial shift register array 60 of FIG. 4 has an output dta bus 201 coupled to decoder 75 and also coupled to a first multibit parallel data input of a variable length shift register array 203. The remaining multibit parallel data input of shift register array 203 is coupled to the data bus from encoder 44. The data output bus 204 of shift register array 203 is coupled to the multibit data input of shift register array 200. Shift register arrays 200 and 203 are controlled by appropriate control and clock signals furnished thereto from control unit 205 by multi-lead control signal buses 206, 207, respectively.

Variable length shift register array 203 comprises five M-bit serial shift registers arranged in a conventional vernier input scheme so that data from either shift register array 200 or encoder 44 may be input to different ones of the several cascaded stages therein and so that data may be output to shift register array 200 from the output stage of shift register array 203. M is an integer typically equal to twice the display capability of the calculator display 19. Such arrangements are well known to those skilled in the art, and accordingly, further details thereof are omitted to avoid prolixity.

The supervisory control signals supplied to shift register array 200 via bus 206 comprise shift register clock signals and the ENTER/RECIRCULATE control signal supplied to control unit 205 from ENTER/RECIRCULATE switch 14. The supervisory signals supplied to variable length shift register array 203 on bus 207 comprise shift register clock signals and also gating signals specifying data entry from either encoder 44 or shift register array 200 and the stage into which data is to be entered. In addition to the ENTER/RECIRCULATE signal, the information signals supplied to control unit 205 comprise a signal of appropriate level from STORE/READ switch 15, the EDIT signal from EDIT switch 17, CLEAR signal from detector 186 (FIG. 10), and a pair of multiconductor data buses 209, 211 which specify the states of a pair of counters 212, 213, respectively.

Counter 212 comprises a scale of M/2 bidirectional counter which is clocked by either the shift register clock signal termed EDIT CLOCK, which clock signals are supplied to the incrementing input of counter 212 via an OR gate 215. The EDIT CLOCK is generated by an AND gate 216 whenever an ANY BIT signal appears on lead 49 and EDIT switch 17 is actuated to the EDIT position. Counter 212 is reset by a control signal supplied by an AND gate 218 whenever the $\overline{\text{EDIT}}$ signal is true and a one bit appears on lead 59 signifying a function has been placed in the shift register array 200 output buffer register, which is similar to flip-flops $102_i$ of FIG. 6. The direction in which counter 212 is counted is controlled by the $\overline{\text{EDIT}}$ signal, with $\overline{\text{EDIT}}$ true specifying a UP count.

Counter 213, termed a total character counter, is clocked by the output of an AND gate 220 which generates a clock signal whenever STORE/READ switch 15 is actuated to the READ position, ENTER/RECIRCULATE switch 14 is actuated to the recirculate position and a clock pulse appears at the output of OR gate 215. Total character counter 213 may be reset by either actuation of the STORE/READ switch to the store position or actuation of clear auxiliary memory switch 12. Counter 213 may be disabled from counting without altering the count state by a control signal on lead 214, which is generated in the manner described below.

Operation of the FIG. 11 circuit proceeds in the following manner. With the auxiliary memory unit in the READ and RECIRCULATE modes of operation and the EDIT function disabled, operation of sequence switch 16 begins readout of the first string of data characters which are output via bus 201 to decoder 75 and thence to calculator 10. As each data character is read out by a clock pulse on lead 57, both character string counter 212 and total character 213 are incremented. After the last five bit character of the first complete original numeric data entry has been read out, both counters 212 and 213 hold a count which signifies the total number of characters comprising the first complete original numeric data entry. If the EDIT function is not specified, the next appearing clock pulse shifts the five bit function character into the output buffer register of shift register array 200 which causes AND gate 218 to generate a reset signal which resets character string counter 212 to zero. Thereafter, successively appearing clock pulses on lead 57 cause the next complete original numeric data entry to be output from shift register array 200 to decoder 75 and into variable length shift register array 203. When the last such character has been output from shift register array 200, character string counter 212 holds a count which signifies the number of characters comprising the second complete original numeric data entry while total character counter 213 holds an accumulated count specifying the total number of data and function characters output from shift register array 200 since the start of the READ and RECIRCULATE modes of operation. Operation continues until the READ mode is terminated or the EDIT function is specified by actuating EDIT switch 17.

When the EDIT function is specified, the $\overline{\text{EDIT}}$ signal changes state thereby switching character string counter 212 to the reverse mode of operation. Subsequent appearance of the CLEAR control signal, which may be generated in the same manner described above with reference to the circuit of FIG. 10, enables control unit 205 to generate control signals on bus 207 for clearing those stages of variable length shift register array 203 specified by the state of character string 212 in which the last-entered complete original numeric data character string is located. Thereafter, the first five-bit character generated by encoder 44 in response to actuation of a numeric data key 11 is loaded into that stage of variable length shift register array 203 which is adjacent the five-bit function character previously readout from shift register array 200, and character string counter 212 is decremented by one count. The next five-bit numeric data character generated in response to keyboard actuation is loaded into the adjacent upstream stage and character string counter 212 is again decremented by one count. This process continues until all numeric data characters of the newly entered correct numeric data have been loaded into variable length shift register array 203. During this process, total character counter 213 is disabled by a control signal on lead 214 from control unit 205 until a number of characters has been entered which equals the number of characters comprising the original incorrect numeric data entry, which is specified by a count of zero in character string counter 212. For this purpose, control unit 205 may include a conventional zero detector coupled to a control gate which generates a disabling signal until the zero state of character string counter 212 is sensed.

As will be appreciated by those skilled in the art, the total number of characters in the newly entered data may be less than, equal to, or greater than the total number of characters in the originally entered data which was incorrect. If the total number of newly entered characters is less than the originally entered number, the count in total character counter 213 must be correspondingly adjusted at the end of the EDIT operation. This may be accomplished by either decrementing total character counter 213 by appropriate clock signals from control unit 205, or preferably by disabling total character 213 during the next character readout cycle until readjustment has been effected. Circuitry for implementing either of these two functions is conventional and known to those skilled in the art. If the total number of newly entered characters equals the number of characters in the previously entered data, no adjustment is required. If the total number of characters in the newly entered data is greater than the total number of characters in the originally entered data, total character counter 213 is incremented when each newly entered character is loaded into shift register array 203 after character string counter 212 reaches a zero count. This is accomplished by removing the disable signal on lead 214 from control unit 205 after character string counter 212 has reached a count of zero.

Vernier adjustment of variable length shift register array 203 is controlled in accordance with the count states achieved by counters 212 and 213 during the EDIT operation. For example, if the total number of newly entered characters is less than the total number of originally entered characters, character string counter 212 controls the vernier input adjustment in such a manner that preceding stages of variable length shift register 203 are progressively inserted upstream of the last-entered function character. If the total number of newly entered characters exceeds the total number of previously entered characters, total character counter 213 controls the input vernier adjustment in a similar manner.

In operating a calculator embodying the invention, including the automatic stored data realignment and sequence functions provided by the circuitry of FIG. 10, the operator proceeds in the following manner.

| KEY IN | DISPLAY | COMMENT |
|---|---|---|
| STORE { [STORE] | 0 | |
| [CLR AUX MEM] | 0 | |
| [C] | 0 | INITIAL DATA |
| [C] | 0 | STRING I.D. |
| 25124 | 25124 | |
| [+] | 25124 | |
| 300 | 300 | |
| [=] | 25424 | |
| 7432 | 7432 | |
| [−] | 7432 | |
| [=] | 17992 | |
| READ { [READ] | 0 | STORED DATA RE- |
| [SEQ] | 0 | ALIGNED |
| | 25124 | |
| | 25124 | |
| | 300 | |
| | 25424 | |
| | 7432 | |
| | 7432 | |
| | 17992 | |

During the READ mode of operation, as the data entries are displayed by display unit 19 of calculator 10, they are visually checked against a list of original data which was to be entered by the operator. So long as the recalled numeric data corresponds to the original data to be entered, no operator action is required. If a recalled numeric data entry is at variance with the original numeric data to be entered, operator action is required. In the following example, assume that the third data entry, viz. the number 7432, is incorrect and that the original data to be entered was the number 7452. Operation would proceed as follows.

| KEY IN | DISPLAY → | COMMENT |
|---|---|---|
| [READ] | 0 | STORED DATA REALIGNED |
| [SEQ] | 0 | |
| | 25124 | |
| | 25124 | |
| | 300 | |
| | 25424 | |
| | 7432 | |
| [EDIT ON] | 7432 | HALT READ |
| [C] | 0 | CLEAR CALCULATOR ENTRY REGISTER |
| 7452 | 7452 | ENTER CORRECT DATA INTO CALCULATOR |
| [EDIT OFF] | 7452 | |
| [SEQ] | 7452 | RESUME READ |
| | 1772 | CORRECT RESULT |

As will now be apparent, the invention described above provides an added degree of flexibility to electronic display calculators not hitherto enjoyed by calculators of this type. Moreover, the invention is fully compatible with a wide range of existing electronic display calculators, and may be inexpensively implemented with only minor modifications thereto. Further, circuitry embodying the invention is particularly well adapted for implementation in integrated circuit form, and it is contemplated that the additional circuit elements necessitated by the invention may be included on the same integrated circuit chip embodying the conventional calculator elements.

While the above provides a full and complete disclosure of the preferred embodiments of the invention, various modifications, alternate constructions and equivalents may be employed without departing from the true spirit and scope of the invention. For example, while auxiliary memory unit 25 has been illustrated as employing serial shift registers, equivalent circuit implementations, e.g. circuitry employing addressable random acess memories, may be employed as required in particlar applications. Therefore the above description and illustrations should not be construed as limiting the scope of the invention which is defined by the appended claims.

What is claimed is:

1. In an electronic calculator having a keyboard with a plurality of digit keys and arithmetic function keys for generating signals representative of numeric data and functions to be performed on said data, calculator means for receiving said signals and performing said functions with said numeric data to provide computational results, and display means for displaying said numeric data and said results, the improvement comprising auxiliary store means for sequentially storing and retaining successively generated ones of said numeric data and function signals in accordance with the order of generation thereof, read means for sequentially reading out at least some of said signals in a predetermined order after said calculator means has provided said computational results, and means for enabling sequential display in said predetermined order of the numeric data signals read out by said read means.

2. The combination of claim 1 wherein said predetermined order and said order of generation are the same.

3. The combination of claim 1 wherein said display enabling means comprises means for coupling the read out signals to the calculator display means.

4. The combination of claim 1 wherein said auxiliary store means includes a storage device and means responsive to the generation of each of said signals for enabling said storage device to store the generated signal.

5. The combination of claim 4 wherein said storage device is a serial shift register and said enabling means includes means for clocking stored signals along said shift register.

6. The combination of claim 1 wherein said read means includes a manually actuatable switch for generating a signal and means responsive to the generation of said read signal for enabling said storing means to initiate sequential read out of said at least some said signals.

7. An electronic display calculator comprising:
 a keyboard having a plurality of digit keys and function keys for generating signals representative of numeric data and functions to be performed on said data;
 calculating means coupled to said keys for receiving said signals and performing said functions with said numeric data to provide computational results;
 display means coupled to said calculating means for displaying said numeric data and said results;
 auxiliary means coupled to said keyboard for sequentially storing and retaining successively generated ones of said numeric data and function signals in accordance with the order of generation thereof;
 read means for sequentially reading out at least some of said signals in a predetermined order after said calculating means has provided said computational results; and
 means for enabling sequential display in said predetermined order of the numeric data signals read out by said read means.

8. The combination of claim 7 wherein said predetermined order and said order of generation are the same.

9. The combination of claim 7 wherein said read means includes a manually actuatable switch for generating a read signal and means responsive to the generation of said read signal for enabling said storage means to initiate sequential read out of said at last some of said signals.

10. The combination of claim 7 wherein said display enabling means includes means for coupling the read out signals to said calculator display means.

11. The combination of claim 7 wherein said auxiliary storing means includes a storage device and means responsive to the generation of each of said signals for enabling said storage device to store the generated signal.

12. The combination of claim 11 wherein said storage device is a serial shift register and said enabling means includes means for clocking stored signals along said shift register.

13. For use with an electronic display calculator having keyboard means for enabling generation of numeric data and function signals, an entry means for receiving said signals, processing means for operating on entered numeric data signals in accordance with entered function signals, and display means for providing a visual indication of entered numeric data and computational results, the improvement comprising an auxiliary memory unit having a STORE mode for sequentially storing aand retaining successively generated ones of said numeric data and function signals in accordance with their order of generation and having a READ mode for sequentially supplying signals stored therein to said calculator entry means to enable visual verification of a series of numeric data signal entries after said processing means has operated thereon to produce said computational results.

14. The combination of claim 13 wherein said auxiliary memory unit includes control means for enabling said auxiliary memory unit to successively store and retain said signals and for enabling said auxiliary memory unit to read out the signals previously sequentially stored therein.

15. The combination of claim 14 wherein said control means includes editing means for temporarily halting sequential read out of said stored signals during said READ mode to permit correction of erroneous numeric data previously entered during said STORE mode.

16. The combination of claim 13 wherein said auxiliary memory unit includes storage means having an input and an output, input means coupled to the input of the storage means and adapted to be coupled to said calculator keyboard means, output means coupled to said output of said storage means and said input means for supplying entry signals to said calculator entry means, and control means for controlling operation of said auxiliary memory unit.

17. The combination of claim 16 wherein said output means further includes gating means for coupling said signals from said keyboard means to said calculator entry means during said STORE mode of operation and for coupling signals from said storage means to said calculator entry means during said READ mode of operation.

18. The combination of claim 17 wherein said control means includes means for temporarily disabling read out of said storage means signals during said READ mode to permit alteration of numeric data signals in said calculator entry means.

19. The combination of claim 16 wherein said input means includes means for encoding said numeric data and function signals from said keyboard means into a character format compatible with said storage means, and said output means includes decoder means for decoding characters read out from said storage means into a signal format compatible with said calculator entry means.

* * * * *